Patented Apr. 11, 1950

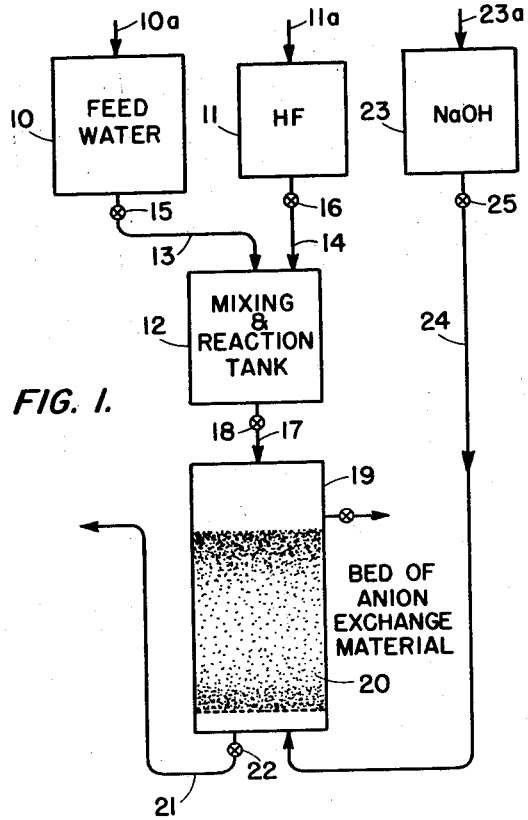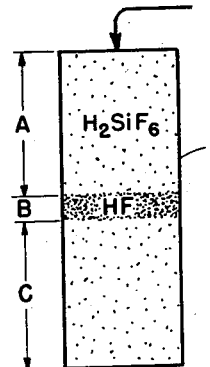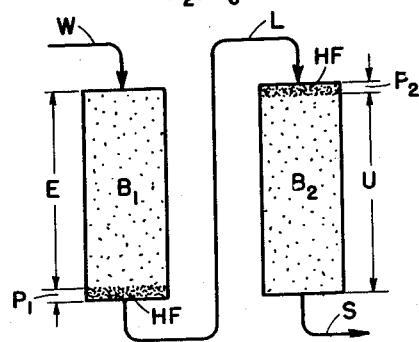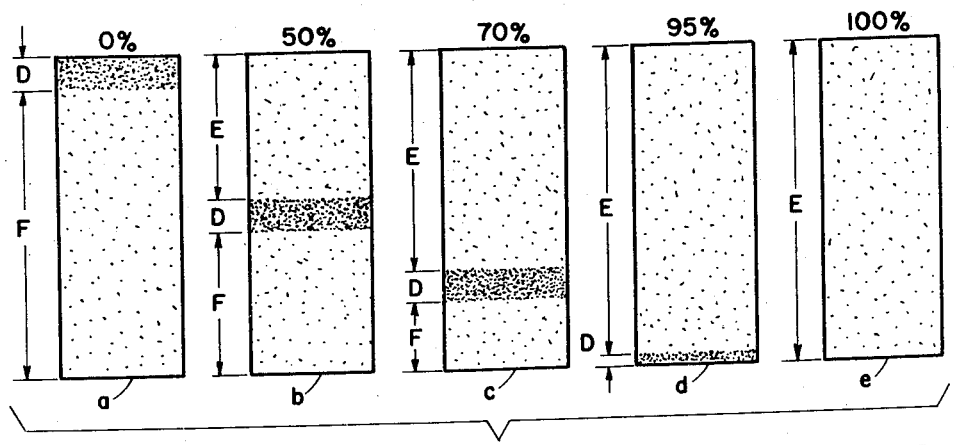

2,503,769

UNITED STATES PATENT OFFICE 2,503,769

PROCESS FOR REMOVING SILICA FROM WATER

Elliott J. Roberts, Westport, Conn., assignor to The Dorr Company, Stamford, Conn., a corporation of Delaware Original application April 14, 1945, Serial No. 588,388. Divided and this application June 2, 1947, Serial No. 751,682

1 Claim. (Cl. 210—24)

This invention relates to chemical water treatment, and more in particular to the treatment of boiler feed waters for silica removal.

The removal of silica from boiler feed waters has become an important problem in recent years with the trend for higher pressure boilers. Under high pressure operating conditions boiler tube failures have often been traced to siliceous deposits and trouble is also encountered from these deposits on turbines and in superheaters.

All sources of natural waters contain some dissolved silica and surface waters, a usual occurrence being about 10–15 P. P. M. $SiO_2$, and in addition usually contain suspended silica. The removal of suspended silica can generally be obtained by coagulation and filtration while chemical processes are necessary for removal of the colloidal and dissolved silica. Several chemical processes have been developed for this purpose, but nearly all fail to remove the silica to a low enough tolerance and many processes increase the salt content of the water. The silica tolerance or maximum amount of silica allowed in the boiler feed waters have not been definitely established, but as complete as possible a removal of silica is desirable, especially under high pressure boiler operating conditions, because of the greater tendency of the $SiO_2$ to form highly insoluble compounds at the higher temperatures and higher pressures. Indeed, silica compounds formed under these conditions may not entirely yield even to scale removal treatment with NaOH.

Some treatment methods may reduce the silica content in the feed water, leaving the balance of $SiO_2$ to be reacted with NaOH or other well known conditioning chemicals to produce soluble reaction products, for instance by the reaction:

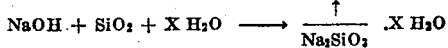

which merely changes the silica to a form less scale-producing, but still presenting the problem of reducing these reaction products to a minimum concentration so as to avoid their possible corrosive effect within the boiler system.

Another example of conventional methods of silica removal is what may briefly be called the Magnesia Method. Magnesia (MgO) or magnesium hydroxide (MgOH) added to the water binds the $SiO_2$ and precipitates it in some flocculent form removable by filtration; yet this introduces and leaves in the water an excess of the conditioning chemical which in turn increases the water hardness and eventually forms scales in combination with $SiO_2$. Moreover, an undue excess of conditioning chemical would be required to remove the silica to the extent desired.

A combination method provides for removing first one portion of the $SiO_2$ by magnesia treatment, and converting the remainder by NaOH-treatment.

While feed water free of $SiO_2$ and other solutes or salts is attainable by using the condensate of a low pressure boiler as feed water for a high pressure boiler, this invention has for its object to devise a chemical method for effecting economically the substantially complete removal of $SiO_2$ from the feed water.

Still other methods of feed water treatment are based on the ion exchange principle which involves contacting the water with ion exchange materials briefly termed ion exchangers or exchangers, such as zeolites, or with those organic or synthetic resinous exchange materials now known as organolites. But any such exchange treatment as now known fails to remove silica as contained in the water.

One such method, whereby ionized solutes can be removed or abstracted from the water, involves the treatment of the water in two sequential exchange stages, namely first with a cation exchange material and then with an anion exchange material, whereby the solutes which are susceptible to such treatment are chemically replaced with the molar equivalent of pure water. An understanding of the operation of this sequential exchange principle is desirable in connection with the present invention, and it is therefore more fully explained as follows:

The cation exchanger in that instance is saturated with H-ions and therefore also called an H-ion exchanger. It releases H-ions into the water in exchange for the molar equivalents of cations of the solutes. To the extent of that exchange the corresponding acid is formed in the water passing through a bed of H-ion exchange material. The water thus acidified is then passed through a bed of anion exchange material capable of neutralizing the acid in the sense that it releases OH-ions in exchange for the anions of the acid, forming pure $H_2O$, or else in the sense that the acid molecule as such is adsorbed by the exchanger. The anion exchange material is therefore also known as an acid-adsorbing material. In due course of such operation the exchange materials lose their exchange capacity which can be restored by regeneration, that is by contact with a suitable regenerant solution which in the case of the H-ion exchanger is a suitable mineral acid such as $H_2SO_4$ or HCl, and in the case of the anion exchange material an alkali such as $Na_2CO_3$, of suitable concentration.

While the sequential cation and anion exchange treatment will serve to abstract from the water solutes sufficiently strongly ionized, there are instances or treatment problems involving the use of only the one or the other of these exchange stages. For instance, a water or liquid may be subjected to H-ion exchange only, and the resulting liquid be neutralized in some manner other than by anion exchange, or else a water or liquid already acid may be de-acidified by being contacted with the anion exchange or acid-adsorption material.

This invention proposes to effect a substantially complete removal of the silica ($SiO_2$) by subjecting the water to an auxiliary reaction converting the silica in the water into a suitable acid, and then removing that acid from the water by contact with an acid-adsorbing or anion exchange material.

When water to be treated passes downwardly through a bed of exchange material, the exhaustion of the bed progresses downwardly from end to end of the bed; that is, the exhausted upper portion of the bed keeps on growing downwardly as the unexhausted portion below it diminishes, until exhaustion has reached the bottom of the bed, at which time regeneration is required. The substantial exhaustion of the exchange capacity of the bed as a whole is indicated by what is known as the breakthrough; that is the appearance of those ions in the effluent which the exchange material is normally expected to remove. If a regenerant solution is passed through the bed, then regeneration proceeds in a similar progressive fashion, namely from one end of the bed to the other. It can be said that a certain exchange material has a certain inherent exchange capacity as well as inherent regeneration requirements under predetermined operating conditions.

Cation as well as anion exchange materials adapted to function in the manner above indicated, are exemplified by a group of materials now known as organolites because they are of an organic, that is synthetic resinous nature, as distinguished from earlier cation exchange materials, the so-called zeolites, which are of inorganic nature.

This invention proposes to subject the water to an auxiliary treatment step or reaction whereby the silica ($SiO_2$) is converted into a suitable acid, namely one that is removable from the water by ion exchange treatment such as can be effected by means of the aforementioned treatment with a regenerable anion exchange or acid-adsorbing material.

In order to provide for this auxiliary reaction a quantity of fluoride may be supplied in the form of NaF although the $Na^+$ must be replaced with $H^+$ as by way of cation exchange, that is to say by contact with an acid-regenerated cation exchange material.

According to one feature, the raw water is first subjected to de-mineralization treatment by sequential contact with cation- and anion exchange materials, which treatment is followed by the silica removal treatment which is based on the concept that the silica must be converted into an acid which in turn can be removed by the anion exchange material.

This invention proposes an auxiliary treatment which comprises reacting the silica ($SiO_2$) with hydrofluoric acid (HF) to the end of producing hydrofluosilicic acid ($H_2SiF_6$) which in turn is abstracted from the water by treatment with the anion exchange material.

In an embodiment of this invention, a zone or band of HF held by the anion exchanger is allower or caused to form in the exchange bed, and this zone or band by way of the ion exchange phenomena taking place is in effect caused to progress or shift through the bed ahead of the zone of exhaustion that develops in the bed; that is as the exchange bed becomes progressively exhausted by the acid reaction product ($H_2SiF_6$) being taken up, there is maintained in advance of that exhausted portion the band or zone of HF.

To embody this invention, the conditioning of the anion exchange bed following its regeneration is effected with alkali, so that it will subsequently and immediately function at highest efficiency with regard to $SiO_2$ removal. The conditioning step includes passing through the bed a sufficient quantity of HF solution to establish a desirable HF-zone at the influent end of the bed prior to starting the passage of water through the bed for silica removal.

To embody this invention, a bed of anion exchange material serving to effectuate the auxiliary reaction as well as the removal of the resulting reaction product or acid ($H_2SiF_6$), is operated in a manner whereby the fluoride (HF) breakthrough and the subsequent silica breakthrough serve as criteria indicating the degree of exhaustion of the anion exchange bed.

To embody this invention, the water from which the silica is to be removed is passed through a pair of anion exchange beds operating in series, whereby the first bed can be substantially fully exhausted with a minimum loss of HF. The complete exhaustion of the first bed is possible according to this mode of operation since the HF-zone or band reaching the end of the first bed is eventually further displaced therefrom and without loss transferred to the next fresh bed while water continues passing through these beds. The transfer of the HF-zone is due to certain affinities of the solutions involved with respect to the exchange material, as will be more fully explained.

An embodiment of this invention provides that to the water having been de-ionized by sequential anion and cation exchange treatment, there shall be added substantially only the theoretical amount of HF needed for reaction with the $SiO_2$ of the water.

To embody this invention there are employed modes of regenerating the anion exchange bed exhausted under these conditions with silica compound, in such a manner that the silica is substantially completely removed from the bed in spite of the tendency of silica to be precipitated on the exchange material; that is, this feature relates to modes of regenerating the bed in a manner whereby the silica is removed from the bed in a soluble form as effluent.

Therefore, the anion exchange bed having been saturated or exhausted with $H_2SiF_6$ is regenerated with an alkali regenerant such as NaOH at an unusually high dilution.

The invention possesses other objects and features of advantage, some of which with the foregoing will be set forth in the following description. In the following description and in the claim, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention as set forth with particularity in the appended claim. The invention itself, however, both as to its organization and its method of operation, together with additional objects and advantages thereof, will best be understood from the following description of a specific embodiment when read in connection with the accompanying drawings in which Fig. 1 is a flowsheet diagram for the removal of silica according to the Non-Cyclic Process.

Fig. 2 is a schematic showing of the anion exchange bed to illustrate the function of the HF band.

Fig. 3 is a schematic showing of the anion exchange bed in various stages of exhaustion, and illustrating the progress of the HF band through the bed and its final complete displacement.

Fig. 4 is a schematic view of a pair of anion exchange beds operating in series, in the process of being exhausted, to illustrate the transfer of the HF band from a first to a second bed.

The flowsheet diagram of Fig. 1 of the Non-Cyclic Process provides a feedwater tank 10; that is, a tank for storing the water from which the silica is to be removed, provided with a feedwater supply 10$^a$. The feedwater to be subjected to the silica removal treatment of this invention should be substantially free from dissolved salts. Therefore it is desirable to have the ionized solutes substantially removed from the water by a preceding de-ionization treatment, whereby the non-ionized silica is left in the water to be separately removed as by this process. For the sake of simplicity it will be assumed for this flowsheet that deionized water having the silica left in it is contained in tank 10. A tank 11 provides for the storage of the initial conditioning reagent, namely HF solution of a suitable concentration, for admixture to the feedwater. The tank 11 has a connection 11$^a$ for supplying HF thereto. A mixing or reaction tank 12 is provided for such conditioning. Flow connections or conduits 13 and 14 lead from the tanks 10 and 11 respectively to the mixing and reaction tank 12, and are provided with control valves 15 and 16 respectively. A flow connection 17 provided with control valve 18 leads from the reaction tank 12 to a tank or cell 19 containing a bed of granular anion exchange material 20, also termed acid-adsorbing material, for instance a material of the organic or synthetic resinous kind such as is exemplified by the anion exchange material designated as I-R 4 by the Resinous Products Company of Philadelphia. An example of a known organic anion exchange material of this character is a soluble resin-like product obtained by the reaction of formaldehyde with an aromatic amine. The tank 19 will herein be termed the exchanger tank or cell. An effluent conduit 21, having a control valve 22, leads from the bottom of the exchanger tank 19 and forms a goose neck G presenting a hydraulic column sufficiently high to balance the liquid level in the exchange tank whereby the substantial submersion of the exchange bed 20 during operation is insured.

The feedwater from tank 10 and the HF solution from tank 11 are mixed in the conditioning or reaction tank 12 where silica of the water reacts with HF to produce hydrofluosilicic acid as follows:

(1)    $6HF + SiO_2 \rightarrow H_2SiF_6 + 2H_2O$

The resulting acid is then removed from the water by contact with the anion exchange bed 20 through which the water is passed for instance downwardly, thus producing a substantially silica-free effluent water leaving the bed through an effluent conduit 21.

A storage tank 23 with a supply therefor indicated at 23$^a$ contains NaOH for regenerating the anion exchange bed 20 after it has been exhausted with $H_2SiF_6$, a supply connection 24 with control valve 25 leading to the exchange tank 19.

While the overall function of the anion bed in removing silica from water dosed with HF lies in the fact that it absorbs $H_2SiF_6$ just as it would absorb such acids as $H_2SO_4$, yet the actual chemical mechanism is not so direct, involving transitional reactions. If water containing $H_2SiF_6$ is passed through a freshly alkali regenerated bed the effluent is not silica-free until a large quantity of the water has passed. This transitional period may be avoided by applying a quantity of HF to the bed after alkali regeneration before any water is passed through the bed for treatment. In this way a protective band of HF absorbed on the exchanger is established and if water containing $H_2SiF_6$ is passed through such a preconditioned bed, the effluent is silica-free right from the start of the water treatment phase. This band progresses through the exchange bed as the bed becomes progressively exhausted. The efficient removal of the silica is due to the presence of this band because it prevents direct contact of the $H_2SiF_6$ in the water with the unexhausted (alkali regenerated) portion of the bed. In other words the water always passes through an HF-zone before it contacts the alkali regenerated portion of the bed. The $H_2SiF_6$ displaces HF from the influent side of the HF-zone and the displaced HF is reabsorbed by the fresh exchange at the effluent side of the zone. In this way the aforementioned progress of the HF-band takes place. Chemically the function of this HF-band is that it prevents decomposition of the $H_2SiF_6$ with consequent formation of silica and leakage thereof with the treated water, which would take place were the $H_2SiF_6$ allowed to come in direct contact with the unexhausted portion of the bed which is alkaline in reaction and would therefore cause the aforementioned decomposition of the $H_2SiF_6$.

Another important aspect of the formation and effect of the HF-band is that with such an HF-band properly established in the bed, reasonable fluctuations in the HF dosing rate will be equalized as far as the effluent is concerned, in that the HF-band decreases or increases in absorbing these dosing fluctuations. This equalizing effect enables one to dose with the theoretical quantity of HF without danger of silica leakage into the effluent even though in practical operation precise dosing rates may not be possible.

This condition can be graphically visualized by reference to the Fig. 2 diagram showing the anion exchange bed N in an intermediate state of exhustion. A top zone A saturated with $H_2SiF_6$ represents the exhausted portion of the bed, while a relatively shallow intermediate zone or band B is saturated with HF, and a lower or bottom zone C represents the unexhauted portion of the bed.

Since it is desirable that the HF-band be present at the top of the bed when the feedwater is started into the bed such a band or zone may be established prior to starting the operation by adding a sufficient amount of HF to the top of the bed, the bed itself having previously been saturated with OH-ions by regeneration with an alkali solution, for instance NaOH.

The progress of exhaustion of the anion exchange bed, as indicated by the progress of the HF-band therethrough, is graphically shown in Fig. 3 (sub-figures a to e) representing an HF-band D, a zone of exhausted material E, and a zone of unexhausted material F of the bed. These figures incidentally indicate the bed as being about 0%, 50%, 70%, 95%, and 100% exhausted, respectively. Consequently the HF-band is shown in consecutive stages of downward progress through the bed. In the Fig. a condition the bed is unexhausted and an HF-band has been provided at the top. In the Fig. b condition the HF-band has moved approximately halfway down the bed. In the Fig. c condition the HF-band approaches the bottom of the bed as the same approaches exhaustion. In the Fig. d condition a portion of the HF-band has been displaced by $H_2SiF_6$ indicating what is herein called the condition of the HF breakthrough of the bed, since the displaced portion of the HF-band now appears in the effluent water. If the exhaustion is still further continued the HF-band will be completely displaced, leaving the bed substantially totally exhausted or saturated with $H_2SiF_6$, this being the Fig. e condition which is substantially incidental to what is herein termed the silica breakthrough condition of the bed; that is, as the HF-band disappears, the effluent water will then show it is substantially the same condition as the influent water—with a portion of $H_2SiF_6$, a portion of $SiO_2$ and a portion of HF—since the bed will then have become substantially ineffective.

In order to preserve the HF contained in the HF-band a pair of anion exchange beds may be operated in series (see Fig. 4). This shows two anion exchange beds $B_1$ and $B_2$ in series, the feedwater entering at W flowing downwardly through bed $B_1$, the effluent water from that bed being transferred as along line L to the top of bed $B_2$ and passing through the same and leaving the bed as silica-free water indicated at S. The beds $B_1$ and $B_2$ are shown in a condition where the bed $B_1$ has been exhausted to the point where a portion of the HF band has been displaced from the bottom of the bed $B_1$ and appears transferred to the top of the bed $B_2$. The bed $B_1$ in this condition comprises an exhausted portion E, and a portion $P_1$ of the HF-band, while the bed $B_2$ comprises a portion $P_2$ of the HF-band and an unexhausted portion U. In this way an HF-band will be established at the top of the second bed at the rate at which it is being displaced at the bottom of the first bed. In this manner the first bed can be completely exhausted past the silica breakthrough condition, since the HF-band being displaced at the bottom is intercepted and re-established at the top of the second bed. This condition of transferring the exchange function as well as the HF-band from the first bed to the second bed is indicated in Fig. 4 showing a first bed $B_1$ and a second bed $B_2$ with a portion of the HF-band still left at the bottom of the first bed and the balance of the HF-band having been established at the top of the second bed. In other words, the HF-band desired to be present at the start of the operation of an anion exchange bed can be automatically obtained by using a series of beds if a second regenerated and washed bed is placed in series with a bed being exhausted shortly before the fluoride breakthrough occurs, the fluoride leakage will be cut by the second bed. Hence, if the first bed is exhausted until the silica in the effluent is nearly identical with the silica in the feedwater the HF-band will be completely transferred from the bottom of the first to the top of the second bed because the strong bivalent $H_2SiF_6$ displaces the weak monovalent HF from the one bed to the next.

The following tabulation represents an effluent water analysis during the exhaustion period of the anion exchange bed indicating numerically where the fluoride breakthrough and the silica breakthrough occur respectively, this being the result of a test run on an anion exchange bed 10" deep and 1" in diameter. There is a rough relationship between the degree of exhaustion shown in the diagram Fig. 3 (sub-figures a to e) which is indicated by the marginal reference to these figures in the following Effluent Analysis tabulation.

| Volume of Feed through Bed | Per Cent Exhausted to Silica Breakthrough | | pH | Specific Resistance | | $SiO_2$ P.P.M. | Fluorides P.P.M. | | |
|---|---|---|---|---|---|---|---|---|---|
| liters | | | | | | | | | |
| 2 | 3.3 | | 7.2 | 280,000 | | .2 | 0 | | Fig. 3a |
| 4 | 6.7 | | 7.15 | 365,000 | | .2 | 0 | | |
| 8 | 13.4 | | 7.10 | 380,000 | | .1 | 0 | | |
| 12 | 20.0 | | 7.05 | 400,000 | | .1 | 0 | | |
| 16 | 26.0 | Here fluoride leakage starts warning of breakthrough, can be caught in second regenerated Bed | 7.00 | 400,000 | Break where Bed should be changed | .1 | 0 | | |
| 20 | 33.0 | | 6.85 | 400,000 | | .1 | 0 | | |
| 24 | 40.0 | | 6.50 | 380,000 | | .1 | 0 | | |
| 28 | 47.0 | | 5.20 | 175,000 | | .1 | 0 | | Fig. 3b |
| 30 | 50.0 | | 5.00 | 150,000 | | .1 | .1 | | |
| 32 | 53.0 | | 4.7 | 100,000 | | .1 | .1 | | |
| 36 | 60.0 | | 4.5 | 80,000 | | .1 | .2 | | |
| 38 | 63.0 | | 4.4 | 65,000 | | 0 | .6 | | |
| 40 | 67.0 | | 4.3 | 41,000 | | 0 | 1.1 | | Fig. 3c |
| 42 | 70.0 | Line of Silica Breakthrough | 4.12 | 28,000 | | 0 | 1.4 | Fluoride present or free HF | |
| 45 | 75.0 | | 4.00 | 20,000 | | 0 | 2.0 | | |
| 50 | 83.0 | | 3.70 | 11,000 | | 0 | 2.9 | | |
| 55 | 92.0 | | 3.50 | 6,500 | | 0 | 5.0 | | |
| 58 | 97.0 | | 3.40 | 4,800 | | .2 | 16.5 | | |
| 60 | 100.0 | | 3.35 | 4,200 | | 1.0 | 22.20 | | Fig. 3d |
| 62 | 104.0 | | 3.20 | 3,500 | | 2.0 | 24.20 | | Fig. 3e |
| 64 | 107.0 | | 3.20 | 2,700 | | 4.0 | 28.20 | | |
| 66 | 110.0 | | 3.20 | 2,100 | | 6.0 | 32. | | |
| 68 | 114.0 | | 3.20 | 1,800 | | 9.0 | 40. | | |
| 70 | 117.0 | | 3.20 | 1,700 | | 12.0 | 50. | | |
| 72 | 120.0 | | 3.20 | 1,700 | | 16.0 | 55. | | |

Alternative modes of initial treatment of the raw water in this process are herein to be considered each of which modes has its advantages depending upon the character and analysis of the raw water; that is the analysis of the solutes or salts other than the silica.

One mode of initial treatment is that which is indicated above, namely where the raw water is first subjected to a preliminary or de-ionization treatment not shown per se in the flowsheet of Fig. 1. Such a preliminary treatment comprises passing the water sequentially through a bed of cation exchange material and through a bed of anion exchange material, whereby substantially all inorganic salts or solutes except the silica are abstracted from the water. The chemical mechanism of the de-salting or de-ionization treatment is well known per se. Suffice it to say that the cation exchange bed, having been regenerated with a suitable mineral acid such as $H_2SO_4$ of suitable concentration, is capable of substituting H-ions for the cations of the salt in the water thereby converting the salt into the corresponding acid. The water leaving the cation exchange bed thus acidified then passes through the anion exchange bed which has been regenerated with a suitable solution of alkali such as $Na_2CO_3$ of suitable concentration, and is therefore capable of adsorbing or abstracting from the water the acid which was produced by the cation. It is also said of the anion exchange bed that it substitutes OH-ion for the anion of the acid which has resulted from the cation exchange so that as a net result of these two ion exchange phases the molar equivalent of pure water (HOH or $H_2O$) is substituted for the salt.

The removal of these salts by this preliminary or de-ionization treatment correspondingly reduces the HF requirement for conditioning the water, inasmuch as otherwise some of the HF would react with the salts instead of with the silica. Also, having an appreciable Ca content Ca may react with HF to produce sufficient $CaF_2$ which is fairly insoluble causing precipitation trouble in the bed which in turn requires more intense backwashing for precipitate removal; thus the preliminary or de-ionization treatment in the conditioning stages of the raw water may be desirable and the expenditures for it warranted.

The HF per se is a corrosive acid and may be produced as needed by treating NaF separately by cation exchange substituting H for Na.

When raw water containing, as it usually does, calcium bicarbonate ($Ca(HCO_3)_2$) is subjected to treatment in the cation bed in the de-ionization operation, there is produced free $CO_2$ dissolved in the water as follows:

(1a) $2HX + Ca(HCO_3)_2 \rightarrow CaX_2 + 2H_2O + 2CO_2$

Ordinarily this $CO_2$ remains in the water when the same is passed through the acid adsorbing anion exchange bed.

In straight de-ionization operations this $CO_2$ is often removed by aeration. In the present process a limited amount of $CO_2$ in the water does not interfere with the efficiency of the silica removal, but where excessive amounts are present and the efficiency of the silica removal thereby affected, the $CO_2$ should be removed by aeration prior to the dosing of the water with HF.

When the anion exchange bed has become exhausted by its adsorption of $H_2SiF_6$ it must be regenerated with a solution of alkali such as $Na_2CO_3$, $NaHCO_3$, or NaOH. Usually 5% concentrated solutions of alkali are used to obtain satisfactory and economical regeneration results. I have found that the anion exchange bed thus exhausted with $H_2SiF_6$ did not lend itself to the regeneration with alkali at the usual concentrations, and that the bed could not be successfully regenerated for instance with 5% $Na_2CO_3$, 4% $NaHCO_3$, or 4% NAOH solutions because these reagents caused the precipitation of $SiO_2$ and $Na_2SiF_6$ which subsequently could only be removed by treatment with exceptionally strong (about 10%) alkali solution, which appeared to be prohibitive.

The potential trouble with the precipitation in the bed incident to alkali regeneration may be visualized from the following equations, with $Na_2CO_3$, $NaHCO_3$, and NaOH respectively as the regenerant;

For $Na_2CO_3$:

(2) $Na_2CO_3 + H_2SiF_6 \rightarrow Na_2SiF_6 + H_2O + CO_2$

With an excess of $Na_2CO_3$ the resulting $Na_2SiF_6$ reacts further to form a flocculent ($SiO_2$)-precipitate and ($6NaF$) solute, as follows:

(2a) $2Na_2CO_3 + Na_2SiF_6 \longrightarrow SiO_2\downarrow + 6NaF + 2CO_2$ For $NaHCO_3$:

Similarly:

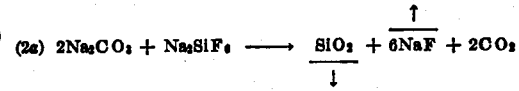
(3) $2NaHCO_3 + H_2SiF_6 \longrightarrow \dfrac{Na_2SiF_6}{\downarrow} + 2CO_2 + 2H_2O$ and $Na_2SiF_6$ reacting with an excess of $NaHCO_3$ as follows:

(3a) $4NaHCO_3 + Na_2SiF_6 \longrightarrow \dfrac{SiO_2}{\downarrow} + 6NaF + 2H_2O + 4CO_2$ For NaOH:

(4) $2NaOH + H_2SiF_6 \rightarrow Na_2SiF_6 + 2H_2O$ and $Na_2SiF_6$ reacting with an excess of NaOH:

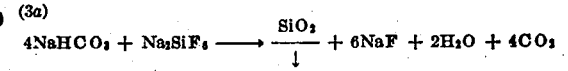
(4a) $4NaOH + Na_2SiF_6 \longrightarrow \dfrac{SiO_2}{\downarrow} + 6NaF + 2H_2O$ Under such conditions I have found that, once the silica has precipitated in the bed, it can be rendered soluble and removed only by a treatment of excess strong NaOH solution (10% NaOH) producing soluble sodium silicate ($Na_2SiO_3$)

as follows:

(5) $SiO_2 + 2NaOH \rightarrow Na_2SiO_3 + H_2O$

However, I have found that the precipitation trouble as well as the cost of precipitate removal can be avoided by using the alkali regenerant, such as NaOH, in relatively high dilution, for instance on the order of 0.5%. In other words, when the anion bed has been exhausted with the water containing the $H_2SiF_6$, it is regenerated with dilute caustic. The strength of the caustic solution that can be used for regeneration is determined by the temperature of the surroundings, and this concentration should not be so high that the concentration of the $Na_2SiF_6$ produced in the regeneration becomes supersaturated and precipitates. Hence, at a temperature of 25° C. the NaOH concentration should be on the order of 0.4% by weight or about 0.1 N. This strength is probably safe down to a temperature slightly below 20° C. If it were possible to maintain a temperature of 40° C., the strength of NaOH could be increased by about 30% because of the increased solubility of $Na_2SiF_6$. At 80° C. the concentration would be increased about 100% to about 0.2 N.

The regeneration with the dilute NaOH solution takes place according to the following equation in terms of ion exchange:

(6) $Y \cdot H_2SiF_6 + 2NaOH \rightarrow Y + Na_2SiF_6 + 2H_2O$ (where Y represents the structure of the anion exchanger); or written as a chemical equation:

(6a) $H_2SiF_6 + 2NaOH \rightarrow Na_2SiF_6 + 2H_2O$

When using the dilute NaOH solution, I have found that the anion bed can be regenerated with four to five equivalents of NaOH per mol of $SiO_2$ adsorbed by the bed, the consumption of caustic being somewhat dependent upon the rate of regeneration. If the bed is regenerated with, say 4% NaOH solution, at least 8 equivalents of NaOH would be required per mol of $SiO_2$ since the reaction that occurs might be expressed by the following equation:

(6b) $Y \cdot H_2SiF_6 + 8NaOH \rightarrow Na_2SiO_3 + 6NaF + 5H_2O$

This equation is actually the result of the operation of Equations 4, 4a and 5. Therefore an additional amount of reagent is consumed in that the silica is removed from the bed as $Na_2SiO_3$ instead of as $Na_2SiF_6$.

Starting with a freshly alkali regenerated anion exchange bed, in order to effect the substantially complete removal of the silica from the feedwater at the outset where the feedwater had been dosed with the theoretical quantity of HF, I have conditioned the influent end portion of the bed by adding a small quantity of dilute HF solution to the bed until a small band of HF was formed at the influent end. The quantity of HF required to produce a satisfactory band of the acid I have found to be about 6 to 10 equivalents of HF per square foot of bed area. The anion exchange or acid-adsorbing material used was that by the Resinous Products Company identified as IR-4 although the anion exchange material named Duolite by the Chemical Process Company of San Francisco, Calif. represents about the equivalent in capacity and might be substituted.

As an example, a 10 inch bed of granular anion exchange material in a 1" plastic tube was regenerated with caustic and then exhausted downflow with solution or feedwater containing 60 P. P. M. $SiO_2$ as $H_2SiF_6$. The bed adsorbed 131 m. eq. $H_2SiF_6$ (m. eq.=milligram equivalents) during exhaustion. After the bed was exhausted it was backwashed to loosen the bed.

The exhausted bed was regenerated upflow with 3.32 liters of 0.1 N NaOH. A flow rate of 0.5 gal./sq. ft./min. was used during the regeneration. After regeneration the bed was washed with de-ionized water.

In order to be certain that substantially complete conversion of dissolved silica to $H_2SiF_6$ in the feedwater would take place, 20 m. eq. of HF was added to the top of the bed. Then the feedwater containing 60 P. P. M. $SiO_2$ as $H_2SiF_6$ was passed through the bed.

The efficiency of silica removal from the bed with 0.1 N NaOH appeared to depend upon the flow rate used in the regeneration. Based on regeneration effluent solution analysis, it appeared that when a regeneration flow rate of 0.5 gal./sq.ft./min. was used, complete removal of $SiO_2$ was obtained with about 4 mols of NaOH per mol of $SiO_2$ while at 1 gal./sq.ft./min. it required about 5 mols per mol of $SiO_2$ to remove all of the silica from the bed. With the higher flow rate, more of the $Na_2SiF_6$ is converted to NaF.

The capacity of the anion exchange material (IR-4) for $H_2SiF_6$ with a feedwater of 60 P. P. M. of silica was about 4.5 m. eq. per dry gram or 35,400 m. eq. per cu. ft. to the silica breakthrough. When an excess HF amounting to about 6 equivalents or 120 gm. of HF per square foot of bed area was added to the top of a 10 inch deep bed, the capacity to the fluoride breakthrough was about 70% of the above figure or 3.2 m. eq. per gram of IR-4. Some fluoride leakage (0.2-1.0 P. P. M.) in the effluent water was observed shortly before the fluoride breakthrough occurred.

The exhaustion or saturation of the bed with $H_2SiF_6$ proceeds as the HF band moves through the bed in the manner and under conditions described above. The net result of the exhaustion of the bed may be represented by the following equation:

(7) $H_2SiF_6 + Y \rightarrow Y \cdot H_2SiF_6$ where Y is the acid absorbing radical of the anion exchange bed.

One explanation of the mechanism of the absorption of the $H_2SiF_6$ and of the function of the HF band is as follows: The freshly alkali regenerated exchange material is alkaline in reaction and in addition to absorbing $H_2SiF_6$ (see Equation 7) would tend to decompose $H_2SiF_6$ just as any other alkali would do as per equation:

(7a) $2Y + Y \cdot H_2SiF_6 + 2H_2O \rightarrow 3Y H_2F_2 + SiO_2$ if $H_2SiF_6$ were allowed to contact freshly alkali regenerated exchange material.

Now, if the $H_2SiF_6$ solution (i. e. conditioned feedwater) is compelled to pass through a layer or zone of HF absorbed by exchange material before it can contact freshly alkali regenerated exchange material, the reaction 7a is suppressed and the following reaction may be considered to take place:

(7b) $Y \cdot H_2F_2 + H_2SiF_6 \rightarrow Y \cdot H_2SiF_6 + H_2F_2$

The exchange material when combined with HF (HF band) is no longer alkaline in reaction, and therefore does not tend to decompose the $H_2SiF_6$. Hence this HF band may be considered as a barrier acting to prevent direct contact of the $H_2SiF_6$ with freshly alkali regenerated exchange material. The HF liberated according to Equation 7b is carried forward through the bed by the water until it comes in contact with freshly alkali regenerated exchange material, whereupon it will re-form $Y \cdot H_2F_2$ as follows:

(7c) $Y + 2HF \rightarrow Y \cdot H_2F_2$

In this way the HF band progresses through the bed and maintains itself as a chemical barrier.

In addition to this function the HF band has an equalizing function in the sense that it permits reasonable fluctuations of the HF-dosing rate without affecting the quality of the finished water. In other words, in spite of such possible fluctuations there is no leakage of silica into the finished water. In case the HF-dosing rate has temporarily dropped below theoretical, this equalizing function of the HF-band can be said to be due to the ability of the HF-band to react with silica as follows:

(7d) $SiO_2 + 3Y \cdot H_2F_2 \rightarrow Y \cdot H_2SiF_6 + 2H_2O + 2Y$

While this equation appears to be contradictory to Equation 7a, it apparently takes place as long as there is sufficient excess of $Y \cdot H_2F_2$ present.

In case the HF-dosing rate has temporarily risen above theoretical, Equation 7c operates and stores HF in the band.

Substantially complete exhaustion of the anion exchange bed may be effected in a two bed operation, but that is with two anion exchange beds operating in series as indicated in Fig. 4.

This application is a division of parent application of Elliott J. Roberts and Walford W. Jukkola, Serial No. 588,388 filed April 14, 1945.

I claim:

A process for the removal of silica from aqueous fluids which comprises adding to an aqueous fluid containing silica an amount of hydrofluoric acid sufficient to convert substantially all the silica present to fluosilicic acid, bring the solution so obtained into contact with an anion exchange material active for the removal of anions from aqueous fluids, and separating said solution from said material.

ELLIOTT J. ROBERTS.

REFERENCES CITED

The following references are of record in the file of this patent:

UNITED STATES PATENTS

| Number | Name | Date |
|---|---|---|
| 2,155,318 | Liebknecht | Apr. 18, 1939 |